Oct. 15, 1963 L. FUCHS 3,106,989
ENERGY ABSORBING DEVICES
Filed March 6, 1962 2 Sheets-Sheet 1
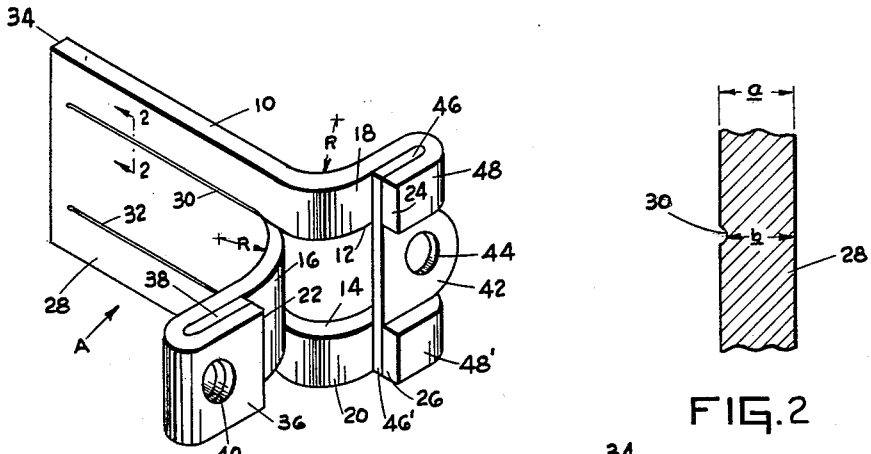
FIG. 1
FIG. 2
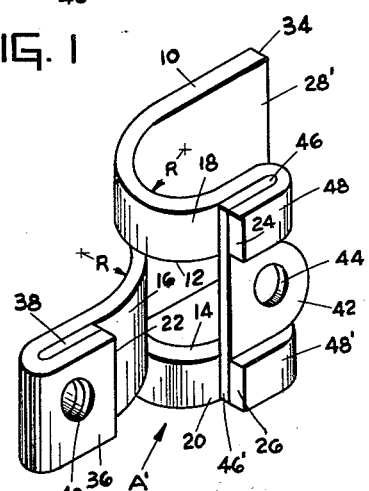
FIG. 3
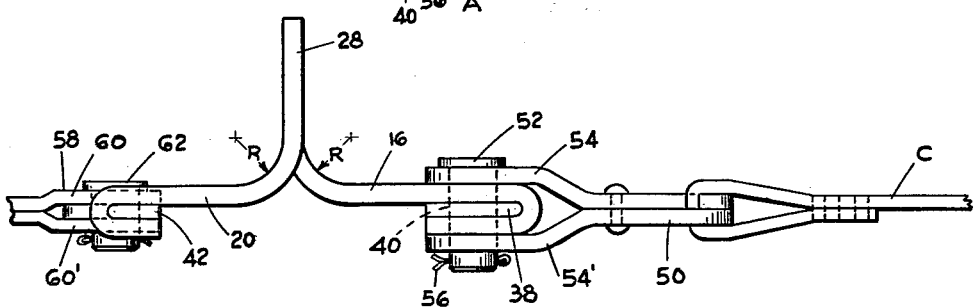
FIG. 4
INVENTOR.
LOUIS FUCHS
BY
Harry S. Shapiro
ATTORNEY

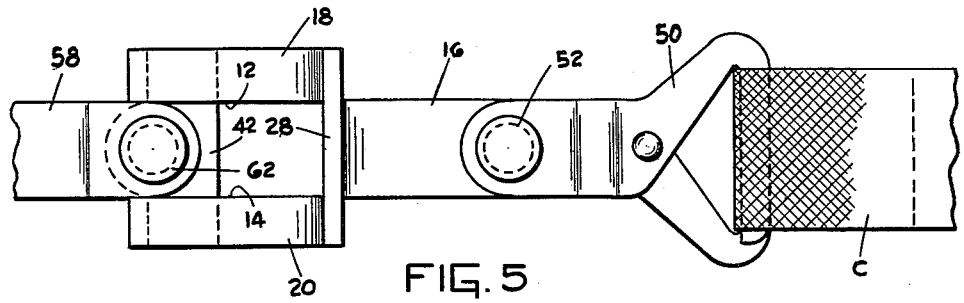
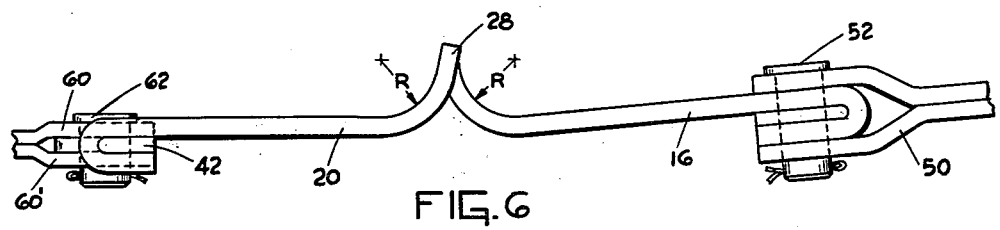
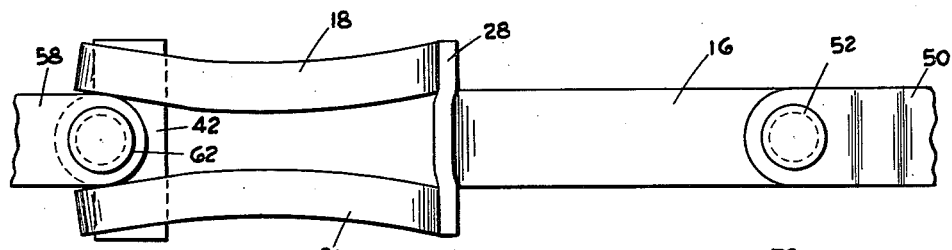
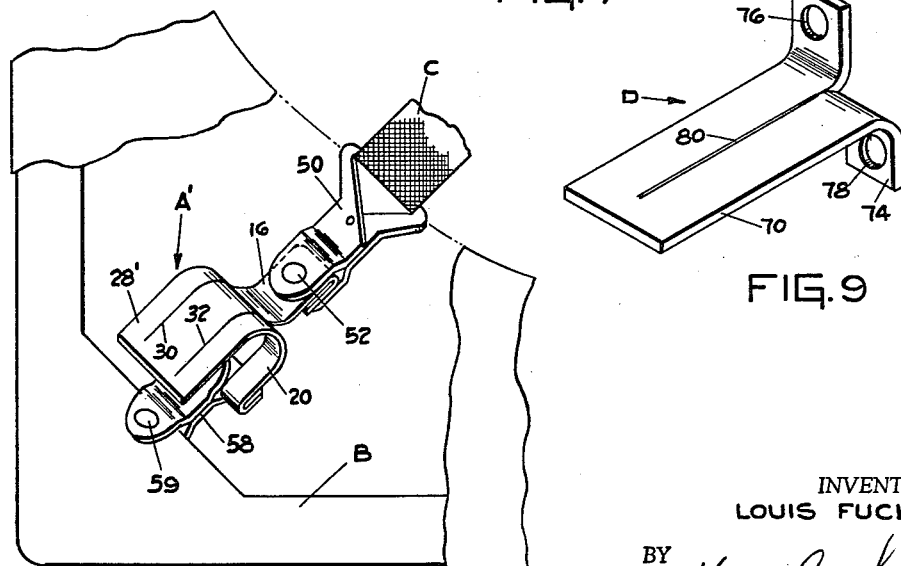

United States Patent Office 3,106,989
Patented Oct. 15, 1963

3,106,989
ENERGY ABSORBING DEVICES
Louis Fuchs, East Orange, N.J., assignor to Airborne Accessories Corporation, Hillside, N.J., a corporation of New Jersey
Filed Mar. 6, 1962, Ser. No. 177,878
13 Claims. (Cl. 188—1)

The invention relates to energy absorbing devices, and is more particularly directed to devices adapted for use in conjunction with an airplane or automobile seat belt to reduce an otherwise humanly destructive load to a survivable load.

In present-day high-speed or jet aircraft, the seats are fixedly secured to the cabin floor, and in order to protect the passengers against accidents such as landing gear failure, ground loops, etc., it has been proposed to provide what has been termed a seat belt load limiter intermediate each mounting end of the seat belt and the seat frame. Such seat belt load limiters must be light in weight and sufficiently small to fit between the arm of the seat and the seat cushion and, for the purposes of economy and since they are not subject to re-use, they must be inexpensive to manufacture. Most important, in the event of impact, devices of this kind must be capable of reducing the impact load or shock from a humanly destructive load to a survivable load of approximately 6 to 9 G (1500 lbs.), and to accomplish this absorption of energy without extending more than approximately four (4) inches. Beyond four (4) inches of forward motion, the passenger would hit the seat in front of him.

There are presently two commercially available forms of seat belt load limiters. In one form, the mechanism for absorbing the energy due to impact comprises a bolt and a slotted, flat steel band arrangement in which the bolt, which is larger in diameter than the width of the slot in the band, is pulled or squeezed through the slot when forward thrust is imposed upon the belt and the device is caused to be extended. In the second form of load limiter, a pin having a ball end is pulled through a tube having an inside diameter somewhat smaller than the diameter of the ball end. In both of these forms of seat belt load limiters, sliding friction is involved in the dissipation of the excessive energy. It has been recognized that devices which, in operation, involve frictional forces, leave much to be desired. Friction, particularly sliding friction, introduces variables which are difficult to predict and to control.

In accordance with the present invention, an energy absorbing device is provided which operates upon the principle of progressive shearing or tearing to controllably absorb, reduce or dissipate loads imposed thereon, the absorption of energy being accomplished independently of or without the forces of friction being brought into play. The device of the invention absorbs and reduces energy resulting from excessive loads to a suitable, predetermined and constant level simply, controllably and effectively. For the amount of energy it is capable of absorbing it is small in size and of light weight. The cost of manufacture is minimal, it being made of inexpensive material which may be fabricated by a few simple stamping and forming operations; there are practically no assembly operations involved. Most important, and since the device has only one chance to demonstrate its effectiveness in actual use, predetermined and constant parameters may be imparted to the device of the invention, thereby eliminating variables which may lead to undesirable and even disastrous results.

These, and other objects and advantages of the invention will be apparent from the following detailed description, taken in conjunction with the drawings illustrating several preferred embodiments of the invention, in which:

FIG. 1 is a perspective view of an energy absorbing device made in accordance with one form of the invention;

FIG. 2 is a cross-section taken in the plane of line 2—2 of FIG. 1;

FIG. 3 is a perspective view of another form of the invention;

FIG. 4 is a side elevational view showing the device of FIG. 1 connected intermediate the attachment loop of a seat belt and a bracket connecting the device and belt to a seat frame or the like, the energy absorbing device in this view being shown under load and partially extended;

FIG. 5 is a top plan view of the related elements shown in FIG. 4;

FIG. 6 is a side elevational view similar to FIG. 4, except that the load limiting device has been substantially fully extended;

FIG. 7 is a top plan view of the related elements shown in FIG. 6;

FIG. 8 is a partial view, and broken away, showing the device of FIG. 3 secured intermediate a seat frame and a seat belt; and FIG. 9 is a perspective view of still another form of the invention.

Generally, an energy absorbing device made in accordance with the invention comprises a strip of substantially rigid, substantially inelastic material which is provided with a longitudinally extending line of severance to furnish a pair of segments having free ends. The segments are connected to one another by the remainder of the strip. Each of the segments provides means for connecting the device intermediate a pair of objects, one or both of which will be subjected to a load of a magnitude it is desired to reduce or dissipate. The several segments may be bent out of the plane of the strip in an amount dictated by the particular application for which the device is used, the positions of the segments being arranged so that the load imparted to the device is substantially coincident with the plane in which at least one of the segments is located.

The capacity of the device to absorb energy depends primarily upon the composition of the material of which the device is made and the thickness of the material so that below a predetermined value, the device will not shear or tear. When the load begins to exceed such predetermined value, the device begins to shear, shearing starting at the juncture of the line of severance separating the aforementioned segments with the remainder of the strip. When the device is used in conjunction with a seat belt, the load provided by the mass of a person thrown forward upon impact, upon exceeding the predetermined value below which the device will not shear, will cause the strip to progressively shear through the remainder or uncut portion of the strip. In shearing, the device absorbs the energy generated by the impact upon the belt which, in turn, has been transmitted to the device.

In order to more accurately control the progressive shearing to which the device will be subjected in use, it is preferred to provide a score-line in the uncut portion or remainder of the strip, the score-line starting at the juncture of the line of severance with the uncut portion of the strip and extending coextensively with the line of severance longitudinally of the strip.

For light weight and low cost, the strip preferably is made of a dead-soft aluminum alloy. Other suitable materials are brass, a ferrous alloy or a plastic material such as styrene, methyl methacrylate or the like having suitable predetermined tearing resistance and inelastic or no spring-back properties.

Although for simplicity and economy of manufacture it is preferred to start with a flat strip and to slit it to provide at least a pair of segments as described, it is within the scope of the invention to make the device by casting or molding.

Although particularly suitable to absorb energy due to impact, the device of the invention is also suitable for applications where protection is required for overloads which do not involve impact forces, thereby serving as a simple, inexpensive and reliable mechanical fuse.

In greater detail and referring to FIG. 1, the device A there illustrated is designed for use in conjunction with a seat belt for an airplane or an automobile. A strip 10 of predetermined tear resistance is longitudinally slit at one end thereof intermediate its width along the lines of severance 12 and 14 to provide a central segment 16 and a pair of side segments 18 and 20. The strip is slit from one extreme edge thereof to a point intermediate its length so that the central segment has a free end 22 and the side segments 18 and 20 have free ends 24 and 26, respectively. The central and side segments are connected to one another by the remainder of the strip, designated 28.

In order to provide a dynamically balanced structure, the lines of severance 12 and 14 are spaced from one another and with respect to the side edges of the strip so that the side segments 18 and 20 are substantially equal in width; also, the sum of the widths of the side segments is substantially equal to the width of the central segment.

The central segment 16 is bent out of the plane of the strip to extend at an angle of approximately 90° with respect to the uncut portion 28 of the strip. The side segments 18 and 20 are both reversely bent out of the plane of the strip at substantially the same angle so that the side segments together lie in substantially the same plane as the central segment, as shown. As will be subsequently described, a radius of curvature, R, between each of the segments and the remainder of the strip is provided which furnishes a constant energy absorption level when a load is applied to cause progressive shearing of the remainder of the strip.

The uncut portion 28 of the strip preferably is provided with a pair of longitudinally extending indentations or score-lines 30 and 32, the score-line 30 being formed as a continuation of the line of severance 12 and the score-line 32 being a continuation of the line of severance 14. These laterally spaced score-lines extend substantially the full length of the remainder of the strip stopping short or inwardly of the edge 34. Preferably the score-lines 30 and 32 are formed by indenting the strip with a die.

Although the central segment 16 and reversely bent side segments 18 and 20 may be provided with apertures or slots or any other means to enable connection of the device intermediate a pair of objects such as a seat frame and a seat belt, it is preferred to form the connecting means and reinforce the connections in the manner illustrated. This is simply accomplished by bending the end section 36 of the central segment 16 back onto itself and over a suitable reinforcing member 38 such as a steel insert. The overlying and underlying portions of the central segment and the insert are provided with an aligned attachment hole 40 extending through the two layers of the central segment and the intermediate insert. The connecting means for the side segments is in the form of a flat, bridging attachment member 42 having a central aperture 44. The member 42 is provided with oppositely extending ear portions 46 and 46', and the side segments 18 and 20 are secured to the attachment member by bending the segments' end sections 48 and 48' over onto the ear portions, as shown.

Where it is desired to reduce the dimension of the device in the direction in which the unsevered portion of the strip extends as in FIG. 1, the remainder of the strip may be bent to lie in a plane which extends parallel to the plane in which lie the reversely bent central segments on the one hand and the side segments on the other hand. This variation is shown in FIG. 3 wherein all the parts of the device, designated A', are given like reference characters, the bent remainder of the strip being designated 28'. The action or operation of the devices shown in FIGS. 1 and 3 under load are the same, and the description to follow concerning the principles of operation of the device shown in FIG. 1 are equally applicable for the device shown in FIG. 3.

FIG. 8 illustrates the device of FIG. 3 serving as a link intermediate an airplane seat frame B and one of the mounting ends of a belt C. It is, of course, understood that the same arrangement is provided at the opposite side of the seat frame and belt. As shown, the belt's attachment loop 50, which may be of any usual type, is connected to the central segment 16. As shown in FIGS. 4 and 6, this may be accomplished by passing a bolt 52 through the apertures formed in the spaced portions 54 and 54' of the belt attachment loop, the belt being passed through the aperture 40 formed near the end of the central segment. Connection may be completed by heading over the exposed end of the bolt, or by passing a cotter pin 56 through the end portion of the bolt which extends beyond the outer surface of the belt loop's portion 54'. The other end of the device is connected to the seat frame B by means of a common type of bracket 58 formed to have one end thereof suitably secured, as by a bolt 59, to the seat frame. The opposite end of the bracket has the spaced portions 60 and 60' (FIGS. 4 and 6) between which is received the side segments' connecting member 42. As shown in FIG. 4, a bolt 62 is passed through the aligned apertures in the bracket's portions 60 and 60' and through the aperture 44 of the device's connecting member 42.

The energy absorbing capacity of a device in accordance with the invention is tailored to fit the particular application or end use. For example, in order to provide a device for use in conjunction with an airplane seat belt to dissipate excess energy caused by impact of a passenger being thrown forward against the belt, and to dissipate the excess energy before the device is extended more than four (4) inches, a suitable strip composition, thickness of strip and other desirable characteristics thereof may be as follows. The strip 10 of the device shown in FIG. 1 or FIG. 3 may be of a 5052-0 aluminum alloy (Aluminum Company of America) having a thickness $a$ (FIG. 2) of 0.156 inch. The score-lines 30 and 32 are indented to an extent to furnish a shear-height $b$ so that the ratio of the shear-height to the material thickness, $b/a$, preferably shall be equal to or greater than approximately 90%. A suitable shear-height is 0.145 inch. A lesser shear-height reduces the tear resistance of the device for a given thickness of material, which may be desired for certain uses or applications. The uncut or remainder 28 of the strip is made of a length so that the length of each of the score-lines 30 and 32 from their respective junctures with the lines of severance 12 and 14 to their opposite ends, where they are spaced a short distance, approximately one-eighth (⅛) inch from the end 34, is four (4) inches. The radius of curvature R of the central segment and of the side segments with respect to the remainder of the strip are made equal to one another, and for the composition and thickness of material indicated, such radius is seven-sixteenths (7/16) of an inch.

Regarding the radius R, the selection of such radius of curvature is related to the selected composition of the strip material and its thickness. If the initial radius R varies from what may be termed "the rolling radius," or that radius which will remain constant throughout the extension of the device as it is sheared, the radius under load will change to the proper or rolling radius before progressive shearing or tearing of the uncut portion of the strip begins. By providing the proper and predetermined rolling radius initially, a constant energy absorption level is obtained initially and maintained throughout the extension of the device as it acts to absorb excess energy. A constant energy absorption level initially and the maintenance thereof throughout the imposition of load is highly desirable.

With different inelastic materials, or the same material having a different thickness, the shear-height $b$ and the radius of curvature R are empirically determined to furnish a device which furnishes a constant energy absorption level. The selection of a particular material for the strip and its thickness $a$, the radius of curvature R and the shear-height $b$ are dictated by the particular end use of the device, including the dimensions available for locating the device. With a device as shown in FIG. 1 or 3 made of a 5052-0 aluminum alloy having a thickness, shear-height and radius of curvature R as indicated above, the device will absorb excess energy and maintain a constant energy absorption level of 750 pounds, with no appreciable variation. One such device between each mounting end of the seat belt and the seat frame furnishes a total level of 1500 pounds.

With an initial rolling radius R, the maintenance of the constant energy absorption level is indicated by the fact that such initial radius of curvature R (FIGS. 1 and 3) is substantially unchanged in an intermediate stage of the device's extension as it is absorbing energy (FIG. 4), and in its final stage or fully extended (FIG. 6). As shown in FIGS. 3 to 7, the uncut portion 28 of the strip is cleanly, progressively and controllably sheared along the score-lines 30 and 32. The resistance of the material to tearing acts to absorb the excess energy uniformly and at a constant level.

Where the load need not be applied linearly in the same plane, the principles of the invention may be utilized in a device, designated D, as shown in FIG. 9. Here, a strip 70 of substantially rigid, substantially inelastic material, examples of which have been previously indicated, is longitudinally slit from one end thereof to provide a pair of segments 72 and 74. The segments may be bent out of the plane of the strip at any suitable angle, and are provided near their free ends with suitable means for attachment between a pair of objects. The connecting means may simply be in the form of apertures 76 and 78 as shown. A score-line or line of indentation 80 is provided to extend coextensively with the line of severance which provides the separate segments 72 and 74. The length of the strip may be any desired length, depending upon the application, and similarly the length of the line of indentation along which the progressive shearing will occur when the device is placed under excessive load is made of any desired length. Progressive shearing occurs as long as the device's static capacity is exceeded. The score-line serves to assure the control and maintenance of a predetermined level of energy absorption for a predetermined amount of extension, substantially unaffected by the crystalline or molecular structure of the selected metal alloy or molded plastic material which may otherwise cause shearing to occur in a random path.

It is believed that the advantages and improved results afforded by the energy absorbing devices of the invention will be apparent from the foregoing detailed description of several preferred embodiments of the invention. It will be understood that various modifications and changes will be made without departing from the spirit and scope of the invention as sought to be defined in the following claims.

I claim:
1. An energy absorbing device comprising a strip of substantially rigid, substantially inelastic material, said strip being provided with a longitudinally extending line of severance to provide a pair of segments having free ends, said free ends being located at one end of the strip, the segments being connected to one another by the remainder of the strip, the remainder of the strip extending to the opposite end of the strip said segments being reversely bent out of the plane of the remainder of the strip and lying in substantially the same plane, said segments each providing means for connecting the device intermediate a pair of objects.

2. An energy absorbing device comprising a strip of substantially rigid, substantially inelastic material, said strip being provided with a longitudinally extending line of severance to provide a pair of segments having free ends, said free ends being located at one end of the strip, the segments being connected to one another by the remainder of the strip, the remainder of the strip extending to the opposite end of the strip a longitudinally extending score-line formed in the remainder of the strip substantially coextensive with said line of severance, said segments each providing means for connecting the device intermediate a pair of objects.

3. An energy absorbing device comprising a strip of substantially rigid, susbtantially inelastic material, said strip being provided with a longitudinally extending line of severance to provide a pair of segments having free ends, said free ends being located at one end of the strip, the segments being connected to one another by the remainder of the strip, the remainder of the strip extending to the opposite end of the strip a longitudinally extending score-line formed in the remainder of the strip substantially coextensive with said line of severance, said segments being reversely bent out of the plane of the remainder of the strip and lying in substantially the same plane, said segments each providing means for connecting the device intermediate a pair of objects.

4. An energy absorbing device as set forth in claim 3, wherein the radius of curvature of each of the segments with respect to the remainder of the strip are substantially equal to one another, such radii of curvature providing a constant energy absorption level when a load is applied to cause progressive shearing of the remainder of the strip along said score-line.

5. An energy absorbing device comprising a strip of substantially rigid, substantially inelastic material, said strip being provided with a pair of longitudinally extending lines of severance to provide a central segment and a pair of side segments each having free ends, the segments being connected to one another by the remainder of the strip, said central segment on the one hand and said side segments on the other hand providing means for connecting the device intermediate a pair of objects.

6. An energy absorbing device comprising a strip of substantially rigid, substantially inelastic material, said strip being provided with a pair of laterally spaced, longitudinally extending lines of severance to provide a central segment and a pair of side segments each having free ends, the segments being connected to the remainder of the strip, said central segment on the one hand and said side segments on the other hand being reversely bent out of the plane of the remainder of the strip and lying in substantially the same plane, said central segment on the one hand and said side segments on the other hand providing means for connecting the device intermediate a pair of objects.

7. An energy absorbing device comprising a strip of substantially rigid, substantially inelastic material, said strip being provided with a pair of laterally spaced, substantially parallel, longitudinally extending lines of severance to provide a central segment and a pair of side segments each having free ends, the segments being connected to one another by the remainder of the strip, a pair of longitudinally extending score-lines formed in the remainder of the strip each substantially coextensive with a line of severance, said central segment on the one hand and said side segments on the other hand being reversely bent out of the plane of the remainder of the strip and lying in substantially the same plane, said central segment on the one hand and said side segments on the other hand providing means for connecting the device intermediate a pair of objects.

8. An energy absorbing device as set forth in claim 7, wherein the widths of the side segments are substantially equal to each other, and the sum of their widths is substantially equal to the width of the central segment.

9. An energy absorbing device as set forth in claim 7, wherein the remainder of the strip lies in a plane substantially perpendicular to the plane in which the central and side segments lie.

10. An energy absorbing device as set forth in claim 7, wherein the remainder of the strip lies in a plane substantially parallel to the plane in which the central and side segments lie.

11. An energy absorbing device as set forth in claim 7, wherein the radius of curvature of each of the central and side segments with respect to the remainder of the strip are substantially equal to one another, such radii of curvature providing a constant energy absorption level when a load is applied to cause progressive shearing of the remainder of the strip along said score-lines.

12. An energy absorbing device as set forth in claim 7, wherein the score-lines are formed by indenting the surface of the strip material.

13. An energy absorbing device as set forth in claim 7, wherein the strip of substantially rigid, substantially inelastic material is selected from the class consisting of aluminum, brass, a ferrous alloy and a plastic material.

References Cited in the file of this patent
UNITED STATES PATENTS 2,785,775     Stevinson _____ Mar. 19, 1957

FOREIGN PATENTS 131,450     Great Britain _____ Aug. 21, 1919